Oct. 10, 1933.　　　　C. H. WILLIS　　　　1,929,727
ELECTRIC VALVE CONVERTING SYSTEM
Filed Dec. 22, 1931
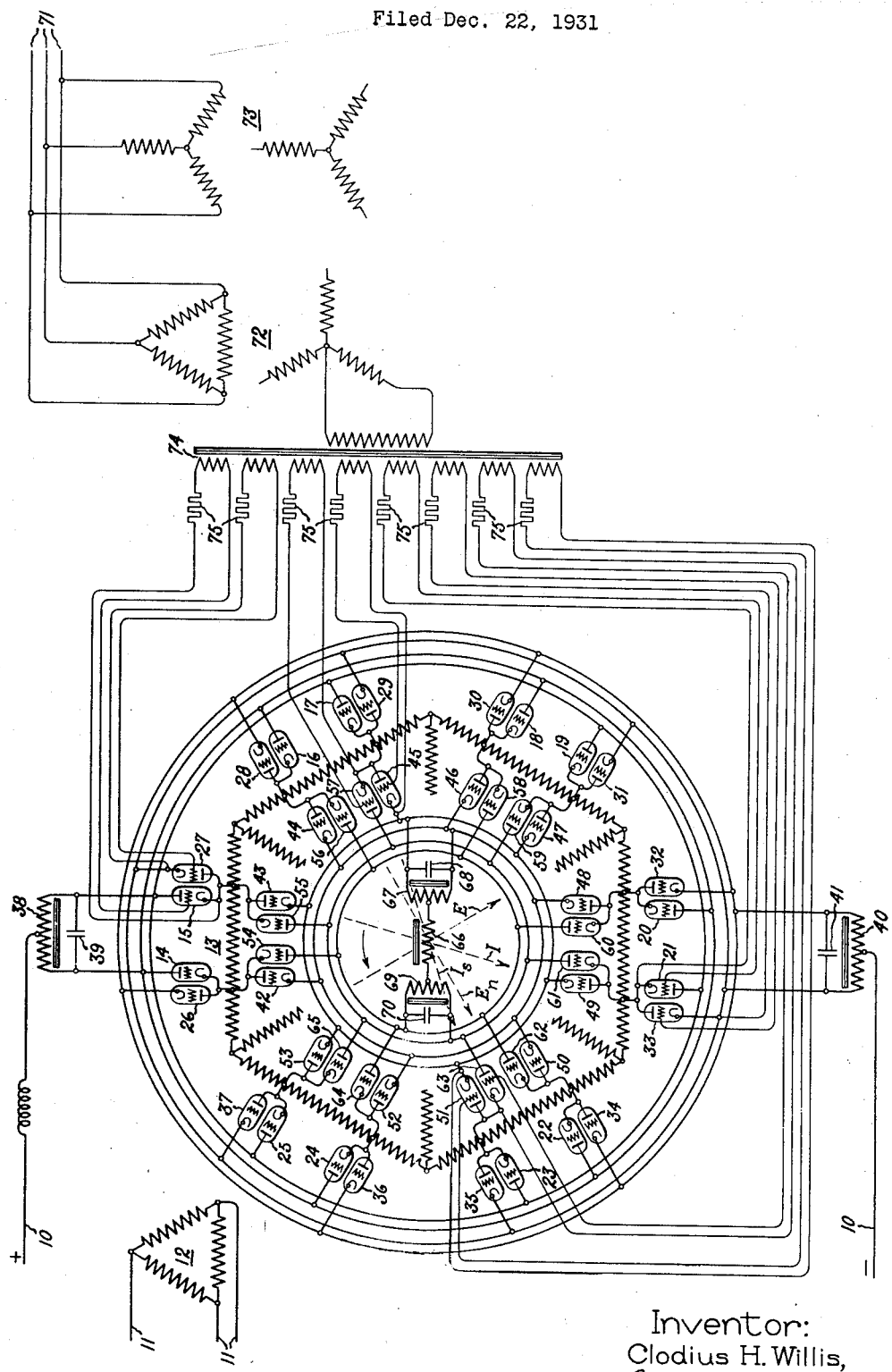
Inventor:
Clodius H. Willis,
by Charles E. Mullen
His Attorney.

Patented Oct. 10, 1933

1,929,727

UNITED STATES PATENT OFFICE 1,929,727

ELECTRIC VALVE CONVERTING SYSTEM

Clodius H. Willis, Princeton, N. J., assignor to General Electric Company, a corporation of New York Application December 22, 1931
Serial No. 582,585

7 Claims. (Cl. 175—363)

My invention relates to electric valve converting systems and more particularly to such systems including electric valves for transmitting energy between direct and alternating current circuits.

Heretofore there have been devised numerous apparatus including electric valves for transmitting energy between direct and alternating-current circuits, or alternating-current circuits of different frequencies, phases or voltages. Many of these arrangements of the prior art have comprised a polyphase inductive network inductively or conductively connected to the alternating-current circuit and interconnected with the direct-current circuit through a plurality of electric valves which are adapted to be successively rendered alternately conductive and non-conductive. It has been found that when apparatus of this type is connected to supply energy to an alternating-current circuit which is not connected to an independent source of electromotive force for determining its frequency and wave form, the wave form of the alternating potential, which is normally a stepped approximation of a sine wave, is substantially distorted from such approximation by the departure of the alternating current circuit from unity power conditions. The disadvantages of a distorted alternating potential wave are too well known to require discussion. Electric valve converting apparatus of the type to which my invention is particularly applicable are disclosed in my co-pending applications, Serial Nos. 566,367 and 566,372, filed October 1, 1931, and assigned to the same assignee as the present application which disclose and broadly claim certain features described in the present application.

It is an object of my invention, therefore, to provide an improved electric valve converting apparatus for transmitting energy from a direct-current supply circuit to an alternating-current load circuit which is not connected to an independent source of electromotive force for determining its wave form, which will overcome the above mentioned disadvantages of the arrangements of the prior art and which will be simple and reliable in operation.

It is a further object of my invention to provide an improved electric valve converting system for transmitting energy from a direct-current circuit to an alternating-current circuit which is not connected to an independent source of electromotive force for determining its wave form in which an alternating potential of approximately sinusoidal wave form will be established on the alternating-current circuit.

It is a still further object of my invention to provide an improved electric valve converting apparatus for transmitting energy from a direct-current circuit to an alternating-current load circuit in which there is provided a circulating current substantially in quadrature with the load current of the apparatus to improve the wave form of the alternating potential established on the load circuit.

In accordance with one embodiment of my invention, direct and alternating-current circuits are interconnected through a poly-phase inductive network and a plurality of electric valves, the valves being successively rendered conductive in such a manner as to establish an axis of conduction for the network which rotates at a frequency dependent upon the excitation of the several electric valves. A second direct-current circuit is interconnected with the network through a second group of electric valves and the conductivity of this second group of valves is so controlled that the axis of conduction for the network provided by the second group of valves is displaced in phase with respect to the axis of conduction established by the first group. It has been found that this provision of a second axis of conduction provides a path for the quadrature current and, by a proper proportioning of the voltages of the two direct-current circuits, establishes a uniform potential gradient in the inductive network and an approximately sinusoidal alternating potential on the alternating current load circuit. In accordance with the preferred embodiment of my invention, the second direct-current circuit is short circuited through a reactance device and the voltage necessary for producing a current along this axis is obtained by displacing this axis of conduction with respect to the neutral voltage axis of the network so that the voltage along this axis produces a circulating current approximately in quadrature with the main load current provided from the direct-current source.

For a better understanding of my invention together with other and further objects thereof, reference is had to the following description taken in connection with the accompanying drawing and its scope will be pointed out in the appended claims. The single figure of the accompanying drawing illustrates an apparatus embodying my invention for transmitting energy from a direct-current circuit to a three-phase alternating-current circuit.

Referring now to the single figure of the drawing there is illustrated an arrangement for transmitting energy from a direct current 10 to a three-phase alternating-current circuit 11. This arrangement includes a transformer comprising a three-phase network 12 connected to the alternating-current circuit 11 and a six-phase network 13 provided with twelve electrically spaced terminals, thus being equivalent to a twelve-phase network. The network 13, which is connected in the form of a regular hexagon, is preferably provided with diagonal windings connected to a common neutral, a portion only of these windings being illustrated for the sake of clarity in the drawing, although this system of connection forms no part of my present invention, but is disclosed and broadly claimed in my copending application, Serial No. 566,369, filed October 1, 1931. The positive side of the direct-current circuit 10 is connected to the network 13 through a group of electric valves 14—25, inc., and a reactor 38 provided with an electrical midpoint connected to the direct-current circuit and with end terminals connected to the valves associated with alternate phase terminals of the network 13. A commutating capacitor 39 is connected between the terminals of the reactor 38. Similarly, the negative side of the direct-current circuit is interconnected with the inductive network 13 through the group of valves 26—37 inc., a mid-tapped reactor 40 and capacitor 41. A second direct-current circuit is provided between the several phase terminals of the network 13 which are connected to be short-circuited through a group of positive electric valves 42—53, inc., a reactance device 66 and a group of negative electric valves 54—65, inc., the commutating reactor 67 and capacitor 68, being interposed in the connections to the group of positive valves and reactor 69 and capacitor 70 being interposed in the connections to the group of negative valves and being connected similarly to the first described groups of valves. The electric valves 14—37 and 42—65, inc., are each provided with an anode, a cathode, and a control grid, and may be of any of the several types well known in the art, although I prefer to use valves of the vapor electric discharge type. In order to control the conductivity of the several electric valves, there is provided an alternating-current control circuit 71 energized from a source of alternating current of a frequency which it is desired to supply to the circuit 11. The grids of the several electric valves are energized from the circuit 71 through a transformer arrangement for securing a twelve-phase excitation from the three-phase circuit, as for example, by means of the delta-Y transformer 72 and the Y—Y transformer 73. Interposed between each phase winding of the secondary windings of the transformers 72 and 73 is an auxiliary transformer 74 by means of which there are provided a plurality of secondary windings for exciting the grids of the electric valves having independent cathode potentials. In case valves of the vapor electric discharge type are utilized, this transformer 74 is preferably self-saturating so that the alternating potential supplied by the circuit 71 is converted into one of peaked wave form, since each of the several electric valves should be rendered conductive for a period somewhat less than thirty electrical degrees. However, this feature of exciting the grid of a vapor electric discharge valve with an alternating potential of peaked wave form comprises no part of my present invention, but is disclosed and broadly claimed in the co-pending application of B. D. Bedford, Serial No. 485,335, filed September 29, 1930, and assigned to the same assignee as the present application. If desired, current-limiting resistors 75 may be included in the several grid circuits. For the sake of clarity in the drawing, I have illustrated only a single transformer 74 interposed between one phase of the secondary winding of the transformer 72 and its associated valves, but it will be apparent to those skilled in the art that the other phases of the secondary windings of the transformers 72 and 73 will be similarly connected to excite the grids of the other electric valves of corresponding phase sequence.

In explaining the operation of the above described apparatus, it will be assumed that the alternating-current circuit 11 is supplying energy to a load having a substantially lagging power-factor and that the electric valves 15 and 33 are initially excited with a positive impulse from the grid transformer 74, the valves 27 and 21 being simultaneously excited with a negative impulse which is of no effect. Current will then initially flow from the positive direct-current terminal, through the right hand portion of reactor 38, electric valve 15, the inductive network 13, electric valve 33, and the left hand portion of reactor 40 to the other side of the direct-current circuit, establishing an axis of conduction, indicated by the dotted arrow I, through the inductive network. With a lagging load on the circuit 11 and assuming a counter-clockwise phase rotation as indicated, the axis of maximum instantaneous counter-electro-motive force may be indicated by the arrow E and the neutral voltage axis by the vector $E_n$ in quadrature with the axis E. Thus it is seen that in that portion of the network 13 between the vectors I and E current is flowing in opposition to the counter-electro-motive force, while over the remaining portion of the network the current is flowing in phase with the electro-motive force, which results in an unequal voltage distribution over the network between the point of entrance and the point exit of the load current. Since the instantaneous voltage distribution over the network as a whole corresponds to the voltage of one particular phase terminal over the complete cycle, it is seen that such a voltage distribution distorts the wave form of the potential supplied to the circuit 11. However, it will be noted that, in the arrangement described above, electric valves 45 and 63 are rendered conductive simultaneously with electric valves 15 and 33, thus completing a substantially quadrature short-circuit path across the network through the valve 45, the upper portion of reactor 67, reactor 66, the lower portion of reactor 69 and electric valve 63, to the diametrically opposite point of the network. This short-circuit path for the quadrature current allows a circulating current to flow, which, added vectorially to the load current I, will produce a total current in the network 13 substantially in phase with the counter-electro-motive force E and thus result in more uniform voltage distribution over the network. The amount of this circulating quadrature current will be determined by the difference in voltage between the axis of conduction of the short-circuit current $I_s$ and the neutral voltage axis of the network $E_n$, which obviously varies with the power-factor, thus automatically maintaining the correct voltage distribution over the network at any power-factor. While I have illustrated the axis of conduction of the short-circuit current as being displaced from the axis of conduction of the load current by 60 electrical degrees, it will be obvious to those skilled in the art that under certain power-factor conditions on the alternating-current circuit 11, it may be desirable to increase or decrease this angle by simultaneously exciting the short-circuiting valves and the main power conductive valves displaced one phase more or one phase less than those illustrated. For example, by simultaneously exciting valves 15 and 33, and 44 and 62, the displacement between the two axes of conduction will be 30 electrical degrees, or by simultaneously exciting the valves 15 and 33, and 46 and 64, the axes of conduction will be displaced by 90 electrical degrees. Thirty electrical degrees after the time initially assumed, electric valves 16 and 34, and 46 and 64 will be rendered conductive, thus advancing both axes of conduction through 30 electrical degrees. In this manner the axes of conduction of the load current and the short-circuit current will be successively rotated around the inductive network 13, and an alternating potential of approximately sinusoidal wave form will be established on the alternating-current circuit 11. While I have illustrated means for establishing a second axis of conduction displaced in phase with respect to the main axis of conduction in which the voltage necessary for maintaining current along this axis is derived from the network itself, it is to be understood that a second source of direct current connected in circuit with the reactor 66 will produce the same result, in which case the voltage of the second source will be determined by the displacement between the axes of conduction and the power-factor of the load. By properly varying the relative magnitudes of the voltages of the two direct-current circuits the resultant axis of conduction may be brought in line with the axis of counter-electro-motive force of the network 13 to secure the desired improvement in wave form.

The manner in which the several commutating reactors and capacitors 38—39, 40—41, 67—68 and 69—70 operate to commutate the load current and short-circuit current between the several electric valves, will be found explained in detail in my above mentioned co-pending applications. In brief, however, as current flows during one interval through one-half of one of the reactors, for example, reactor 38, and electric valve 15, a balancing current must flow through the other half of this reactor, which, neglecting the magnetizing admittance of the reactor, will be equal and opposite to the load current. The only path for this balancing current to flow includes the capacitor 39, with the result that this capacitor becomes charged during the interval to a potential dependent upon the magnitude of the load current. When electric valve 16 is made conductive, it will be seen that the potential of the capacitor 39 is so related to the valves 15 and 16 and of such a polarity as to transfer the current from the valve 15 to the valve 16, even though the electro-motive force of the inductive network 13 interconnecting these valves is in such a direction as to oppose such a transfer; that is, the current may be transferred between the valves under any desired power-factor conditions on the alternating-current circuit. Since the commutating potential necessary for transferring the current between the several electric valves depends upon the magnitude of the current in the particular circuit, it is seen that it is necessary to displace the axis of conduction of the short-circuit current $I_s$ from the neutral axis $E_n$ of the network in order that there shall be a difference of potential necessary to maintain the circulating current through the apparatus and thus a continuity of service of the apparatus for variable power-factor conditions.

For the sake of simplicity, my invention has been illustrated as applied to valve-converting apparatus of the type disclosed in my aforesaid applications. However, it is to be understood that it is of general application to valve-converting apparatus and is particularly advantageous for application to apparatus of the type disclosed and claimed in my co-pending application, Serial No. 582,587, filed December 22, 1931, and assigned to the same assignee as the present application.

While I have illustrated my invention as embodied in an arrangement for transferring energy from a direct-current circuit to a three-phase alternating-current circuit, it will be obvious to those skilled in the art that it is equally applicable to an electric valve converting system of any number of phases, and that while I have illustrated a full wave valve converting system, the invention is equally applicable to a half wave valve converting system, in which case one side of the direct-current circuit is directly connected to the neutral of the inductive network and the group of electric valves and associated commutating apparatus connected to that side of the direct-current circuit is eliminated.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electric valve converting system, the combination of an alternating current circuit including a polyphase inductive network, a direct-current circuit, a group of electric valves interconnecting said network and said direct-current circuit, a second direct-current circuit, a second group of electric valves, and means for controlling the conductivity of said groups of valves to provide two axes of conduction for said network displaced in phase, whereby a substantially sinusoidal potential is established on said alternating-current circuit.

2. In an electric valve converting system, the combination of a direct-current circuit, an alternating-current circuit, a polyphase inductive network and a plurality of electric valves interconnecting said circuits, and means for producing a circulating current along an axis of said network displaced in phase with respect to the normal axis of conduction to establish a substantially sinusoidal potential on said alternating-current circuit.

3. In an electric valve converting system, the combination of a direct-current circuit, an alternating-current circuit, a polyphase inductive network and a group of electric valves interconnecting said circuits, means for successively rendering said valves alternately conductive and nonconductive, a second group of electric valves connected to short circuit said network, and means for successively rendering conductive valves of said second group connected to said network at points substantially in quadrature to the points connected to the conductive valves of said first group.

4. In an electric valve converting system, the combination of a direct-current circuit, an alternating-current circuit, a polyphase inductive network and a group of electric valves interconnecting said circuits, means for successively rendering said valves alternately conductive and non-conductive, a reactance device, a second group of electric valves connected to short circuit said network through said reactance device, means for successively rendering conductive valves of said second group connected to said network at points substantially in quadrature to the points to which the conductive valves of said first group are connected, and means for introducing in the connections between said second group of valves and said reactance device an alternating potential for commutating the current between said valves under any desired power-factor conditions on said alternating-current circuit.

5. In an electric valve converting system, the combination of a direct-current circuit, an alternating-current circuit, a polyphase inductive network and a group of electric valves interconnecting said circuits, means for successively rendering said valves alternately conductive and non-conductive, means for introducing into the connections between said valves and said direct-current circuit an alternating potential for commutating the current between said valves under any desired power-factor conditions on said alternating-current circuit, a reactance device, a second group of electric valves connected to short circuit said network through said reactance device, means for successively rendering conductive valves of said second group connected to said network at points substantially in quadrature to the points to which the conductive valves of said first group are connected, and means for introducing in the connections between said second groups of valves and said reactance device an alternating potential for commutating the current between said valves under any desired power-factor conditions on said alternating-current circuit.

6. In an electric valve converting system, the combination of a direct-current circuit, an alternating-current circuit, a polyphase inductive network and a group of electric valves interconnecting said circuits, means for successively rendering said valves alternately conductive and non-conductive, a reactance device, a second group of electric valves connected to short circuit said network through said reactance device, a capacitor interposed in series relation with the short-circuit current and so connected that its terminal potential is effective to commutate the short-circuit current between said second group of valves, and means for successively rendering conductive valves of said second group connected to said network at points substantially in quadrature to the points connected to the conductive valves of said first group but slightly displaced therefrom to maintain a circulating current through said capacitors whereby a commutating potential is maintained under any desired power-factor conditions on said alternating-current circuit.

7. In an electric valve converting system, the combination of a direct-current circuit, an alternating-current circuit, a polyphase inductive network and a group of electric valves interconnecting said circuits, means for successively rendering said valves conductive to establish a rotating axis of conduction for the load current to said network, a reactance device, a second group of electric valves connected to short circuit said network through said reactance device, a capacitor interposed in series relation with the short-circuit current and so connected that its terminal potential is effective to commutate the short-circuit current between said second group of valves, and means for controlling the conductivity of said second group of valves to establish an axis of conduction for the short-circuit current displaced somewhat less than 90 electrical degrees from the axis of conduction of said load current, whereby a circulating current is maintained through said capacitors under any desired power-factor conditions on said alternating-current circuit.

CLODIUS H. WILLIS.